United States Patent [19]

Foster et al.

[11] Patent Number: 5,270,060
[45] Date of Patent: Dec. 14, 1993

[54] USE OF TOCOPHEROL TO STABILIZE CHEWING GUM RUBBER

[75] Inventors: John W. Foster, Piscataway; Charles P. Orfan, Howell; Daniel A. Vento, Riverdale; Archie L. Hightower, Plainfield; Scott E. Hartman, Roosevelt, all of N.J.

[73] Assignee: Wm. Wrigley Jr. Company, Chicago, Ill.

[21] Appl. No.: 33,293

[22] Filed: Mar. 12, 1993

Related U.S. Application Data

[63] Continuation-in-part of Ser. No. 874,711, Apr. 27, 1992, Pat. No. 5,200,213, which is a continuation of Ser. No. 743,824, Aug. 12, 1991, Pat. No. 5,132,121.

[51] Int. Cl.$^5$ .............................................. A23G 3/30
[52] U.S. Cl. ........................................... 426/3; 426/72
[58] Field of Search .......................... 426/3-6, 426/534, 651; 523/100, 105

[56] References Cited

U.S. PATENT DOCUMENTS

| | | | |
|---|---|---|---|
| 2,333,656 | 3/1942 | Mattill et al. | 99/163 |
| 4,001,438 | 6/1977 | Marmo et al. | 426/96 |
| 4,101,559 | 7/1978 | McFadden et al. | 260/347.3 |
| 4,107,177 | 8/1978 | McFadden et al. | 260/332.3 |
| 4,107,321 | 8/1978 | McFadden et al. | 424/274 |
| 4,212,789 | 7/1980 | Anspon | 260/33.6 |
| 4,305,962 | 12/1981 | del Angel | 426/3 |
| 4,312,802 | 1/1982 | Anspon | 260/33.6 |
| 4,489,099 | 12/1984 | Shaheen et al. | 426/3 |
| 4,504,499 | 3/1985 | Finnan | 426/250 |
| 4,694,090 | 9/1987 | Shiono et al. | 549/407 |
| 4,714,612 | 12/1987 | Nakamura et al. | 424/85 |
| 4,765,927 | 8/1988 | Nomura et al. | 253/400.2 |
| 4,870,196 | 9/1989 | Thorengaard | 549/410 |
| 4,891,209 | 1/1990 | Heim | 424/48 |
| 4,891,231 | 1/1990 | Mai et al. | 426/52 |
| 4,925,888 | 5/1990 | Aumueller et al. | 524/91 |
| 4,948,595 | 8/1990 | Patel et al. | 426/3 |
| 4,977,282 | 12/1990 | Baldwin et al. | 549/412 |
| 5,009,891 | 4/1991 | Niwa et al. | 424/195.1 |
| 5,043,100 | 8/1991 | Chang et al. | 252/398 |
| 5,063,264 | 11/1991 | Nakajima | 524/118 |
| 5,200,213 | 4/1993 | Orfan et al. | 426/3 |
| 5,200,214 | 4/1993 | Barkalow et al. | 426/3 |

FOREIGN PATENT DOCUMENTS

1079746 7/1976 Japan ................................ 426/541
88-31442 6/1988 Japan .

OTHER PUBLICATIONS

Article, "Food Processing 1989 Awards", Food Processing Magazine, Jul. 1989.
Akzo Technical Bulletin, Akzo Salt, Inc., TB 1570, Sep. 1989.
Akzo Product Information brochure, Akzo Salt, Inc., PI 1590, Oct. 1987.
Akzo Product Information brochure, Akzo Salt, Inc., PI 1580, Oct. 1987.
Akzo Product Information brochure, Akzo Salt, Inc., PI 1560, Oct. 1987.
Article, "Antioxidants: Past, Present, Future", Food Processing Magazine, May 1990.
Article, "Natural Tocopherols Provide Antioxidant Protection To Meats", Food Processing Magazine, Apr. 1988.
Brochure, "Eastman Tenox GT-1 and Tenox GT-2", Eastman Kodak Co., May 1991.
FCC III/Monographs, pp. 41-42 (date not known).

*Primary Examiner*—Jeanette Hunter
*Attorney, Agent, or Firm*—Willian Brinks Olds Hofer Gilson & Lione

[57] ABSTRACT

A chewing gum elastomer is stabilized with a specific mixture of tocopherol homologs, thereby eliminating the need for synthetic antioxidants. The mixture of tocopherol homologs falls within the range of 7-20% by weight alpha tocopherol, 45-75% by weight gamma tocopherol, 18-32% by weight delta tocopherol and, optionally, 0-3% by weight beta tocopherol.

25 Claims, 1 Drawing Sheet

USE OF TOCOPHEROL TO STABILIZE CHEWING GUM RUBBER

RELATED APPLICATIONS

This application is a continuation-in-part of U.S. application Ser. No. 07/874,711, filed on Apr. 27, 1992, now U.S. Pat. No. 5,200,213, which in turn is a continuation of U.S. application Ser. No. 07/743,824, filed on Aug. 12, 1991, now U.S. Pat. No. 5,132,121, the entire disclosures of which are incorporated herein by reference.

FIELD OF THE INVENTION

The present invention relates to a chewing gum elastomer composition which contains a specific blend of tocopherol homologs which provides improved antioxidant effects.

BACKGROUND OF THE INVENTION

As is known in the art, chewing gum compositions typically comprise a water soluble bulk portion, a water insoluble chewing gum base portion and typically water insoluble flavoring agents. The water soluble portion dissipates with a portion of the flavoring agent over a period of time during chewing. The gum base portion is retained in the mouth throughout the chewing process.

The gum base includes a number of ingredients, some of which are subject to deterioration through oxidation during storage. The insoluble gum base generally comprises elastomers, elastomer plasticizers, waxes, fats, oils, softeners, emulsifiers, fillers, texturizers and miscellaneous ingredients such as antioxidants, preservatives, colorants and whiteners. Ingredients having a double bond between carbon atoms, including fats, oils, some elastomers and elastomer plasticizers, are susceptible to oxidation. The gum base constitutes between 5–95% by weight of the chewing gum composition, more typically 10–50% by weight of the chewing gum, and most commonly 15–35% by weight of the chewing gum.

Commonly used natural or artificial antioxidants/preservatives include beta-carotenes, acidulants (e.g. Vitamin C), propyl gallate, butylated hydroxyanisole (BHA), and butylated hydroxytoluene (BHT). The most notable and commonly used of these include synthetic antioxidants BHA and BHT.

Tocopherols are naturally occurring compounds which are known to have antioxidant properties. The most common tocopherol, alpha-tocopherol, is also known as vitamin E. The other common homologs are beta, gamma and delta tocopherols. Natural tocopherols are usually derived from vegetable oils, especially soybean oil. Tocopherols can also be found in many spices, fruits, nuts, seeds and other plant sources.

Tocopherols have previously been used successfully as stabilizers for some chewing gum ingredients, such as styrene butadiene rubber, but only when added in combination with certain synthetic stabilizers. U.S. Pat. No. 4,489,099 issued to Shaheen et al. discloses the use of vitamin E tocopherol in combination with dilauryl thiodipropionate (DLTDP), as a stabilizer for a styrene butadiene rubber. The stabilizer system may be combined with the rubber using a variety of techniques, including emulsification of the stabilizer followed by addition to styrene butadiene rubber latex, and coagulation of the latex.

U.S. Pat. No. 2,333,656 discloses a synergystic effect between tocopherol and quinones, when used as antioxidant for fats and oils. Japan Patent Disclosure 88-31442 discloses a deodorizing agent which can be used in chewing gum, which can contain a mixture of methyl hesperidin and delta tocopherol.

U.S. Pat. No. 4,694,090 discloses that vitamin E (alpha tocopherol) is known as a highly safe antioxidant, but states that vitamin E is likely to become oxidized and discolored. Until now, tocopherols have not been sufficiently effective when used as chewing gum antioxidants, without other antioxidants also being present.

SUMMARY OF THE INVENTION

The present invention is directed to a stabilized elastomer composition for use in chewing gum which contains, as an antioxidant, a specific mixture of at least three tocopherol homologs, alpha, gamma, and delta, in specific ratios. Beta tocopherol and possibly other homologs may also be present. It has been discovered that the mixture of tocopherol homologs, present in the specific ratios, exhibits significant improvement in antioxidant properties when used in the elastomer components of chewing gum bases. The homolog mixture useful in the invention is as effective, and sometimes more effective, than BHT and BHA.

Expressed as percentage ranges of active ingredients (i.e. weight percentages based on total tocopherols) the ranges are 7–20% alpha tocopherol, 45–75% gamma tocopherol and 18–32% delta tocopherol. The preferred ranges are 12–17% alpha tocopherol, 60–68% gamma tocopherol and 22–28% delta tocopherol. The most preferred ranges are 12–15% alpha tocopherol, 63–65% gamma tocopherol and 23–26% delta tocopherol. Up to 3% beta tocopherol may optionally be present.

The tocopherol mixtures used in the present invention may be naturally occurring products, mixtures of naturally occurring products, modifications of natural products, mixtures of component tocopherols or natural products with added component tocopherols. Normally, the tocopherol mixture will be present in a diluent, most commonly a vegetable oil. The amount of the diluent is not important from an antioxidant standpoint. However, active levels of about 70% (reflecting about 70% by weight tocopherol and about 30% by weight diluent) are preferred for viscosity and handling reasons.

With the foregoing in mind, it is a feature and advantage of the invention to provide a stabilizer system for chewing gum elastomers which minimizes the oxidation of the chewing gum elastomers without the use of synthetic antioxidants such as BHA and BHT.

It is also a feature and advantage of the invention to provide an improved stabilized elastomer composition for use in chewing gum, which is shelf stable and which does not contain synthetic antioxidants.

These and other features and advantages of the invention will become apparent from the following detailed description of the presently preferred embodiments. It should be understood that this detailed description is illustrative rather than limiting, with the scope of the invention being defined by the appended claims and equivalents thereof.

DETAILED DESCRIPTION OF THE PRESENTLY PREFERRED EMBODIMENTS

Figure 1:
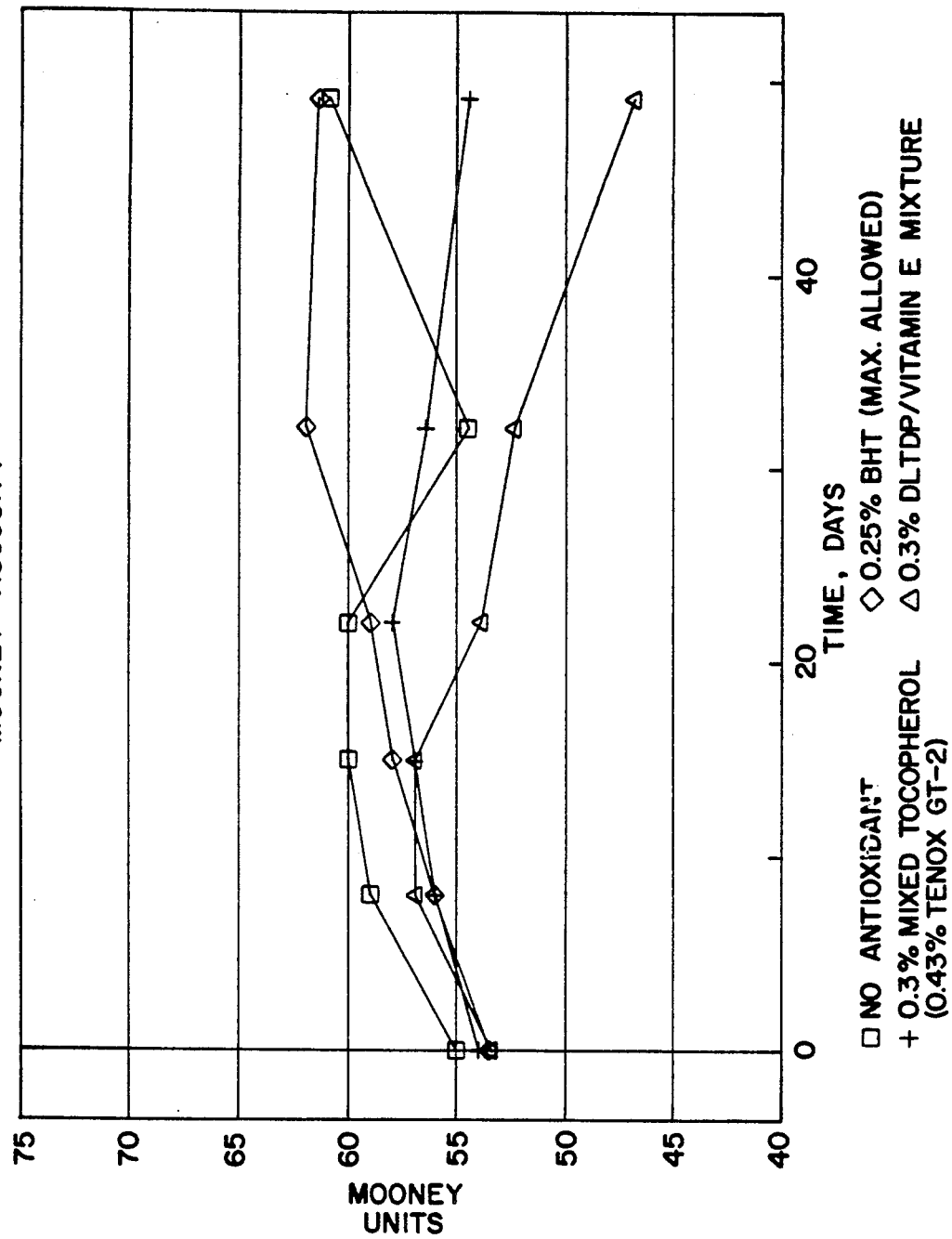
FIG. 1 shows mooney viscosity data as a function of time, for styrene butadiene rubber samples individually stabilized with the all-natural tocopherol mixture used in the invention, with BHT, with a DLTDP/Vitamin E blend, and unstabilized.

Chewing gum, and particularly chewing gum bases, incorporate various water-insoluble elastomeric components which contribute to the elasticity of the chewing gum and the longevity of the chew. These elastomers generally constitute about 5 to about 95 weight percent of the gum base, more preferably about 10 to about 70 weight percent of the gum base and most preferably about 15 to about 45 weight percent of the gum base. The elastomers may include synthetic elastomers such as polyisobutylene, isobutylene-isoprene copolymer, styrene-butadiene copolymer, polyvinyl acetate, vinyl acetate-vinyl laurate copolymer, and combinations thereof. The elastomers may also include natural elastomers such as liquid latex, guayule, jelutong, lechi caspi, perillo, massaranduba balata, massaranduba chocolate, nispero, rosindinha, chicle, gutta hang kang and combinations thereof.

Oxidation of gum base ingredients including elastomers, causes undesirable changes in the color, odor, texture and taste of the chewing gum. It has always been a major objective of chewing gum manufacturers to maintain the quality and prolong the shelf life of chewing gum. Therefore, the oxidation of chewing gum ingredients, including gum base elastomers, is a central concern of chewing gum manufacturers.

Previously synthetic antioxidants BHA and BHT have been primarily used for stabilizing chewing gum elastomers. The common feature that renders these compounds effective as antioxidants is their phenolic-based structure, as shown below:

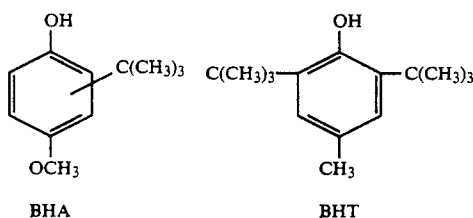

BHA BHT

Tocopherols are natural substances found in vegetable and other plant seeds such as soybeans, sunflower seeds, and various fruits and nuts. The fact that tocopherols are naturally derived makes them more attractive to chewing gum manufacturers and consumers, than synthetic antioxidants. From an antioxidant standpoint, tocopherols are of interest because they contain phenolic-type groups similar to those found in BHA and BHT:

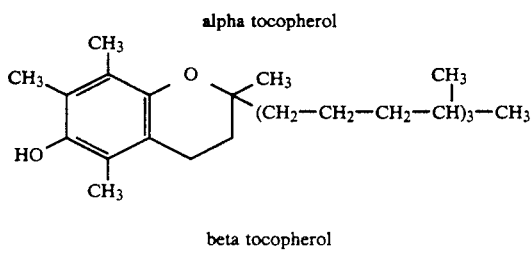

beta tocopherol

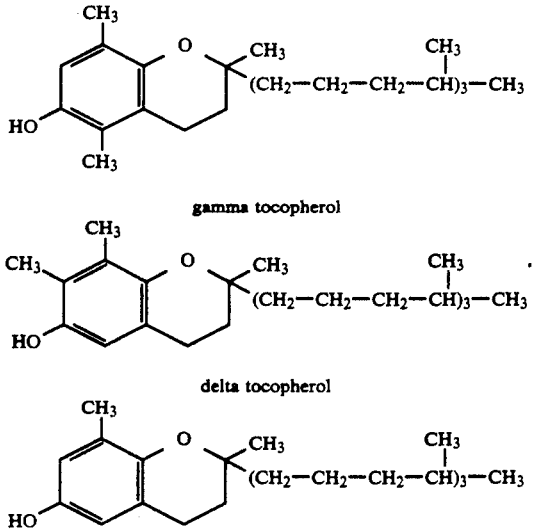

When used individually, the different tocopherol homologs are known to exhibit different levels of chemical activity, including different levels of antioxidant activity. For this reason, processes have been developed for isolating the individual homologs from mixtures, and for converting tocopherols from one homolog to another. Such processes are discussed in U.S. Pat. No. 4,977,282 issued to Baldwin et al.

Prior to the current invention, however, it was not known that specific blends of tocopherol homologs exhibit levels of antioxidant activity in chewing gum elastomers which are higher than each of the homologs taken individually, and which are comparable to BHT and BHA. As previously stated, the present invention relates to the use of tocopherol mixtures in chewing gum elastomers which effect improved antioxidant activity in chewing gum bases, and whose antioxidant activity is similar to or better than that which is found when typical levels of BHT or BHA are used.

In accordance with the invention, a stabilized chewing gum elastomer composition is provided by incorporating the tocopherol mixture described in the foregoing SUMMARY OF THE INVENTION, into a chewing gum elastomer. Preferably, the tocopherol mixture is added during manufacture (e.g. during coagulation) of the elastomer. However, the tocopherol mixture can also be added later. By using the specific tocopherol mixture described above, it has been found that the chewing gum elastomer can be adequately stabilized without using synthetic antioxidants. In other words, the specific tocopherol mixture used in the invention, unlike other tocopherols, can impart sufficient antioxidant stability to the elastomer when used either by itself or in combination with other natural antioxidants.

The preferred method of incorporating the tocopherol mixture into the elastomer may vary depending on the specific type of elastomer being used. In general, the tocopherol mixture may be added during the initial manufacture of the elastomer or may be blended into the elastomer during subsequent processing. The tocopherol mixture may be added either by direct addition to the elastomer latex before or during the coagulation process, or may be placed in a solvent to yield an emulsion, suspension or solution which is then mixed with the elastomer. Edible fats and oils are the preferred solvents.

In the case of styrene butadiene rubber and certain other synthetic elastomers, the elastomer is initially available in a latex form and can be coagulated using processes well known to those skilled in the art, before being added to chewing gum. Hence, one way of adding the tocopherol mixture into styrene butadiene rubber is to emulsify the tocopherol mixture with a food grade emulsifier and add the emulsion to the styrene butadiene rubber latex as described, with respect to another antioxidant system, in U.S. Pat. No. 4,489,099 issued to Shaheen et al., the disclosure of which is incorporated herein by reference.

The latex, with the tocopherol mixture dispersed therein, can then be typically coagulated using a standard salt-acid or salt-base coagulation system known to those skilled in the art. The resulting stabilized styrene butadiene rubber composition can then be added to a chewing gum base using standard techniques as described below. Further discussion of the latex coagulation process is contained in U.S. Pat. No. 4,305,962 issued to Del Angel, the disclosure of which is incorporated herein by reference.

The preferred amount of the tocopherol mixture used in the elastomer may vary depending on the specific type of elastomer being used. The preferred amount of tocopherol mixture may also vary depending on the composition of the gum base in which the elastomer is used, and the composition of the chewing gum in which the gum base is used, because some of the antioxidant can migrate from the elastomer into the other chewing gum components. The following Table 1 describes both the preferred composition of the tocopherol mixture useful in the invention, and the preferred amount which is to be added into the chewing gum elastomer:

TABLE 1

| Tocopherol Composition And Amounts Used | |
|---|---|
| (A) Tocopherol Composition (% by weight, based on total tocopherols) | (B) Amounts Used (% by weight added to elastomer, based on total weight of elastomer) |
| Range | |
| 7–20% alpha tocopherol 45–75% gamma tocopherol 18–32% delta tocopherol | 0.01–1.00 |
| Preferred Range | |
| 12–17% alpha tocopherol 60–68% gamma tocopherol 22–28% delta tocopherol | 0.05–0.80 |
| Most Preferred Range | |
| 12–15% alpha tocopherol 63–65% gamma tocopherol 23–26% delta tocopherol | 0.10–0.60 |

A commercially available tocopherol blend which meets the requirements of the invention is Tenox GT-2, available from the Eastman Chemical Products, Inc., in Kingsport, Tennessee. Tenox GT-2 contains about 12.5% alpha tocopherol, about 63.9% gamma tocopherol, and about 23.6% delta tocopherol based on total tocopherol weight, in a soybean oil diluent (70% tocopherol in 30% soybean oil).

As stated above, a chewing gum contains a water soluble bulk portion and one or more flavoring agents in addition to the chewing gum base. The gum base generally constitutes about 5 to about 95 weight percent of the chewing gum, preferably about 10 to about 50 weight percent of the chewing gum and most preferably about 20 to about 35 weight percent of the chewing gum.

In addition to the elastomers described above, the gum base may include elastomer plasticizers, waxes, softeners/emulsifiers, fillers/texturizers, colorants and whiteners. Elastomer plasticizers constitute from about 0 to about 75 percent by weight of the gum base, preferably 5 to 45 per cent by weight and most preferably 10 to 30 per cent by weight. Elastomer plasticizers include natural rosin esters such as glycerol ester of partially hydrogenated rosin, glycerol ester of polymerized rosin, glycerol ester of partially dimerized rosin, glycerol ester of rosin, pentaerythritol esters of partially hydrogenated rosin, methyl and partially hydrogenated methyl esters of rosin, pentaerythritol ester of rosin or mixtures thereof. Elastomer plasticizers also include synthetics such as terpene resins derived from alpha-pinene, beta-pinene and/or d-limonene.

Waxes include synthetic (e.g. polyethylene and Fischer-Tropsch waxes) and natural (candelilla carnauba, beeswax, rice bran or mixtures thereof) and petroleum (e.g. microcrystalline and paraffin). Waxes, when used, generally constitute up to 30 weight percent of the gum base.

Softeners/emulsifiers include tallow, hydrogenated tallow, hydrogenated and partially hydrogenated vegetable oils, cocoa butter, glycerol monostearate, glycerol triacetate, lecithin, mono-, di- and triglycerides, acetylated glycerides and fatty acids (e.g. stearic, palmitic, oleic, linoleic and linolenic acids) or mixtures thereof. Softeners/emulsifiers generally constitute between 0.5 and 40 weight per cent of the gum base.

Fillers/texturizers include magnesium and calcium carbonate, ground limestone and silicate types such as magnesium and aluminum silicate, clay, alumina, talc as well as titanium oxide, mono-, di- and tricalcium phosphate, cellulose polymers such as ethyl, methyl and wood or mixtures thereof. Preferably, the filler comprises about 1 to about 65 percent by weight of the gum base.

Colorants and whiteners include FD&C-type dyes and lakes, fruit and vegetable extracts, titanium dioxide or mixtures thereof.

The gum base is typically prepared by adding an amount of the elastomer, elastomer plasticizers and filler to a heated sigma blade mixer with a front to rear blade speed ratio of typically 2:1. The initial amounts of ingredients are determined by the working capacity of the mixing kettle in order to attain a proper consistency. After the initial ingredients have massed homogeneously, the balance of the elastomer plasticizer, filler, softeners, etc. are added in a sequential manner until a completely homogeneous molten mass is attained. This can usually be achieved in one to four hours, depending on the formulation. The final mass temperature can be between 60° C. and 150° C., more preferably between 80° C. and 120° C. The completed molten mass is emptied from the mixing kettle into coated or lined pans, extruded or cast into any desirable shape and allowed to cool and solidify.

The water-soluble portion of the chewing gum may comprise softeners, sweeteners, flavoring agents and combinations thereof. Softeners are added to the chewing gum in order to optimize the chewability and mouth feel of the gum. Softeners, also known in the art as plasticizers or plasticizing agents, generally constitute between about 0.5 to about 15.0 percent by weight of the chewing gum. Softeners contemplated by the present invention include glycerin, lecithin, and combinations thereof. Further, aqueous sweetener solutions such as those containing sorbitol, hydrogenated starch hydrolysates, corn syrup and combinations thereof may be used as softeners and binding agents in gum.

Bulk sweeteners constitute between 20-80% by weight of the chewing gum and may include both sugar and sugarless sweeteners and components. Sugar sweeteners may include saccharide-containing components including but not limited to sucrose, dextrose, maltose, dextrin, dried invert sugar, fructose, levulose, galactose, corn syrup solids, and the like, alone or in combination. Sugarless sweeteners include components with sweetening characteristics but are devoid of the commonly known sugars. Sugarless sweeteners include but are not limited to sugar alcohols such as sorbitol, mannitol, xylitol, hydrogenated starch hydrolysates, maltitol, and the like, alone or in combination.

High intensity sweeteners may also be present. These may include but are not limited to sucralose, aspartame, salts of acesulfame, alitame, saccharin and its salts, cyclamic acid and its salts, dihydrochalcones, thaumatin, monellin, and the like, alone or in combination.

Combinations of sugar and/or sugarless sweeteners may be used in chewing gum. The sweetener may also function in the chewing gum in whole or in part as a water soluble bulking agent. Additionally, the softener may also provide additional sweetness such as with aqueous sugar or alditol solutions.

One or more flavoring agents may be present in the chewing gum in an amount within the range of about 0.1 to about 10.0 percent and preferably from about 0.5 to about 5.0 weight percent of the gum. The flavoring agents may comprise essential oils, natural or synthetic flavors or mixtures thereof including but not limited to oils derived from plants and fruits such as citrus oils, fruit essences, peppermint oil, spearmint oil, other mint oils, clove oil, oil of wintergreen, anise, and the like. Artificial flavoring agents and components are also contemplated. Those skilled in the art will recognize that natural and artificial flavoring agents may be combined in any sensorially acceptable fashion.

Optional ingredients such as colors, emulsifiers and pharmaceutical agents may be added to the chewing gum.

In general, chewing gum is manufactured by sequentially adding the various chewing gum ingredients to a commercially available mixer known in the art. After the ingredients have been thoroughly mixed, the gum mass is discharged from the mixer and shaped into the desired form such as by rolling into sheets and cutting into sticks, extruding into chunks, or casting into pellets.

Generally, the ingredients are mixed by first softening (e.g. with heat) the gum base and adding it to the running mixer. The base may also be softened in the mixer itself. Color or emulsifiers may also be added at this time. A softener such as glycerin may also be added at this time along with syrup and a portion of the bulking agent. Further portions of the bulking agent portion may then be added to the mixer. A flavoring agent is typically added with the final portion of the bulking agent.

The entire mixing procedure typically takes from five to fifteen minutes, but longer mixing times may sometimes be required. Those skilled in the art will recognize that variations of the above described procedure, or different procedures, may be followed.

A wide range of changes and modifications to the embodiments of the invention described above will be apparent to persons skilled in the art. The following examples are not to be construed as imposing limitations on the invention, but are included merely to illustrate preferred embodiments.

EXAMPLE 1

The purpose of this Example is to compare the antioxidant performance of the tocopherol blend used in the invention, with the performance of 1) BHT, and 2) a blend of DLTDP and Vitamin E as described in U.S. Pat. No. 4,489,099. In this example, the antioxidants were mixed with the elastomer after coagulation.

A batch of latex elastomer BL 2006, available from Bayer France of Villeurvanne Cedex, France, was coagulated without antioxidant according to the following procedure. Into a coagulation vessel was added a sufficient quantity of liquid latex emulsion to provide 1600 grams of latex dry solids (typical latex dry solids content is 30-40% of the liquid emulsion). The emulsion was then heated to 68° C., agitation continued and one liter of 20% sodium chloride solution for every kilogram of dry latex solids was added. Next, 68° C. tap water was immediately added to obtain an emulsion volume of ten liters. Heat was applied to maintain the temperature of the latex emulsion and agitation continued. After five minutes, the heat source was removed, agitation continued and about 750 milliliters of a one percent sulfuric acid solution was slowly added to coagulate the latex. The coagulant (hereinafter referred to as rubber) was washed until the pH of the liquor was near neutral or near tap water source pH. The washed rubber was removed and dried at 38° C. in an air drying oven.

Next, three stabilized rubber samples were prepared by mixing three separate 750-gram samples of dry elastomer with stabilizer. The first sample was milled with 0.30% by weight mixed tocopherol containing about 12.5% alpha tocopherol, about 63.9% gamma tocopherol, and about 23.6% delta tocopherol, based on total tocopherol weight. The tocopherol mixture used was Tenox GT-2, which contains 70% total tocopherol and 30% soybean oil diluent. The Tenox GT-2 was added at 0.43% by weight of the elastomer, to effect a concentration of 0.30% total tocopherol.

The second elastomer sample was milled with 0.25% by weight BHT. The third sample was milled with 0.30% by weight of a DLTDP/Vitamin E mixture having a DLTDP/Vitamin E ratio of 1.7. For each sample, the milling was accomplished, and mooney viscosity was measured, according to the following procedure.

The milling rolls were set at 0.055±0.005 inches. Seven hundred and fifty (750) grams of rubber in its coagulated particulate form was passed through the room temperature rolls until massed. The rubber was folded around the antioxidant and again passed through the first nine times folded and unfolded on the tenth time. The samples did not rest between passes and did not band on the rolls at any time. The milling process took five minutes. Thereafter, the samples were stored at room temperature and atmospheric conditions.

Mooney viscosity was run periodically on approximately 150 grams of each stabilized sample, and on an unstabilized control sample, by cutting from the milled piece two 2×2×½ inch squares. A number 5 borer was used to bore a hole through the center of each sample. The viscosity samples were each pre-heated for one minute and run on a Scott's Viscometer (Scott Testers, Inc., Providence, Rhode Island) for four minutes at a temperature of 100° C. Readings were recorded every minute and the final reading at four minutes was reported as the mooney viscosity.

The mooney viscosities were measured after zero, 8, 15, 22, 32 and 49 days of storage. The results, which have a margin of error of ±1 Mooney Unit, are plotted in FIG. 1. As shown in FIG. 1, the mooney viscosity of the styrene butadiene rubber stabilized with Tenox GT-2 exhibited greater stability (i.e. less variation in mooney viscosity) than any of the other samples. This suggests that the Tenox GT-2 -stabilized sample did not experience significant chain extension or crosslinking (which cause higher viscosities) and also did not experience significant molecular scission or visbreaking (which cause lower viscosities).

The elastomer stabilized with DLTDP/Vitamin E showed a gradual decrease in mooney viscosity, suggesting scission or visbreaking of some of the styrene butadiene rubber molecules. The elastomer stabilized with BHT showed a gradual increase in mooney viscosity, suggesting crosslinking or chain extension of some of the styrene butadiene rubber molecules. The unstabilized elastomer showed significant mooney viscosity fluctuations in both directions, suggesting a combination of degradation reactions taking place.

The foregoing mooney viscosity data provides evidence that the all-natural tocopherol mixture used in the invention performs at least as well, if not better, than the synthetic antioxidants and synthetic/natural antioxidant blend of the prior art.

Additionally, each of the stabilized and unstabilized styrene butadiene rubber samples was tested for peroxide value after Zero, 7, 14, 21, 28, 49 and 77 days of storage at room temperature and atmospheric conditions. The peroxide value is an indication of the extent of oxidation, given in milliequivalents of peroxide per kilogram of sample. The peroxide values were measured using A.O.C.S. Official Method Cd 8-53, Revised 1986.

For each of the three stabilized elastomer samples, the peroxide value remained at zero throughout the entire 77 days of storage. For the unstabilized control elastomer sample, the peroxide value remained at zero for 28 days but increased to 5 meq./kg after 49 and 77 days of storage. This peroxide value data provides further evidence that the all-natural tocopherol mixture used in the invention performs at least as well as prior art synthetic antioxidants and the synthetic/natural antioxidant blend.

Additionally, each of the stabilized and unstabilized styrene butadiene rubber samples was tested for oxidation using a Schiff's Test, after zero, 8, 15, 22, 32 and 49 days in storage. This test was performed according to the following method.

a) Preparation Of Schiff's Reagent 0.5 grams of Basic Fuschin was completely dissolved in 250 ml of hot water. Fuschin is a commonly known dye. The solution was cooled in the refrigerator and then enough (about 500 ml) sulfurous acid ($H_2SO_3$) was added to decolorize the solution. The solution was allowed to stand overnight. The final solution (Schiff's Reagent) was straw colored. The Fuschin used was basic Fuschin, Parstain brand, available in capsules which contain 0.5 grams of pure dye each.

b) Test Method

Each of the stabilized and unstabilized styrene butadiene rubber samples were broken up into pieces of approximately 0.5 inch in diameter. For each elastomer sample, ten such pieces were placed in a test tube and a sufficient quantity of Schiff's Reagent to cover each piece was added. If any surface oxidation had occurred, a violet color developed on the surface at the location of oxidation.

For each elastomer sample, the degree of oxidation of each of the ten pieces was observed and rated from zero to ten. A "zero" rating indicated no surface oxidation (i.e. no violet color) while a "ten" rating represented 100% surface oxidation (i.e. 100% violet color). The final result for each elastomer (indicated in percent) was determined by adding together the ratings for each of the ten pieces. A completely oxidized sample would therefore have a result of 100%, and a completely unoxidized sample would have a result of 0%. The Schiff's Reagent was allowed to remain in contact with each sample for 15 minutes before the samples were evaluated.

For each of the three stabilized elastomer samples, the Schiff's Test gave a result of 0% oxidation over the entire 49-day storage period. For the unstabilized control elastomer sample, the Schiff's Test gave results of 0% oxidation at 0, 8, 15 and 22 days, 5% oxidation at 32 days, and 100% oxidation at 49 days. This Schiff's Test data provides further evidence that the all-natural tocopherol mixture used in the invention performs at least as well as prior art synthetic antioxidants and the synthetic/natural antioxidant blend.

EXAMPLE 2

The purpose of the Example is to evaluate the efficiency of adding the tocopherol mixture used in the invention, during coagulation of the styrene butadiene rubber.

One batch of liquid latex BL 2006 emulsion was coagulated in the presence of 0.43% by weight of Tenox GT-2, according to the following procedure. Into a coagulation vessel was added a sufficient quantity of liquid latex BL 2006 emulsion to provide 1600 grams of latex dry solids (typical latex dry solids content is 30–40% of the liquid emulsion). Next, 0.43 weight percent Tenox GT-2 (based on latex solids) was added. The emulsion was agitated for 5 minutes to disperse the antioxidant.

The emulsion was then heated to 68° C. and agitation continued. Once the emulsion was heated to 68° C., one liter of 20% salt solution for every kilogram of dry latex solids was added. Next, 68° C. tap water was immediately added to obtain an emulsion volume of ten liters. Heat was applied to maintain this temperature of the latex emulsion and agitation continued. After five minutes, the heat source was removed, agitation continued and about 750 milliliters of a one percent sulfuric acid solution was slowly added to coagulate the latex.

The coagulant (rubber) was washed with tap water until the pH of the liquor was near neutral or near tap water source pH. The first washing liquor was collected for liquid chromatographic texts to determine the quantity of free Tenox GT-2. The washed rubber was remove and dried.

Analyses of the rubber showed that 95.8% of the added tocopherols were present in the rubber. No tocopherols were found in the washing liquor. This shows that Tenox GT-2 can be added efficiently to the latex in its native form, without optional further emulsification.

While the embodiments of the invention disclosed herein are at present considered to be preferred, various modifications and improvements can be made without departing from the spirit and scope of the invention. The scope of the invention is indicated in the appended claims, and all changes that come within the meaning and range of equivalency of the claims are intended to be embraced therein.

We claim:

1. A stabilized elastomer composition which comprises an elastomer and an antioxidant which includes about 7–20% by weight alpha tocopherol, 45–75% by weight gamma tocopherol, 18–32% by weight delta tocopherol and 0–3% by weight beta tocopherol, the elastomer composition being substantially free of synthetic antioxidants.

2. The stabilized elastomer composition of claim 1, wherein the antioxidant comprises about 12–17% by weight alpha tocopherol, 60–68% by weight gamma tocopherol, 22–28% by weight delta tocopherol and 0–3% by weight beta tocopherol.

3. The stabilized elastomer composition of claim 1, wherein the antioxidant comprises about 12–15% by weight alpha tocopherol, 63–65% by weight gamma tocopherol, 23–26% by weight delta tocopherol and 0–3% by weight beta tocopherol.

4. The stabilized elastomer composition of claim 1 wherein the antioxidant is present in an amount of about 0.01–1.00 weight percent of the composition.

5. The stabilized elastomer composition of claim 1 wherein the antioxidant is present in an amount of about 0.05–0.80 weight percent of the composition.

6. The stabilized elastomer composition of claim 1 wherein the antioxidant is present in an amount of about 0.10–0.60 weight percent of the composition.

7. The stabilized elastomer composition of claim 1 wherein the elastomer comprises a styrene-butadiene copolymer.

8. The stabilized elastomer composition of claim 1 wherein the elastomer is a styrene-butadiene copolymer.

9. A stabilized styrene butadiene elastomer composition comprising styrene butadiene elastomer and antioxidant which consists essentially of 7–20% by weight alpha tocopherol, 45–75% by weight gamma tocopherol, 18–32% by weight delta tocopherol and 0–3% by weight beta tocopherol.

10. The stabilized styrene butadiene elastomer composition of claim 9 wherein the antioxidant is added during manufacture of the styrene butadiene elastomer.

11. The stabilized styrene butadiene elastomer composition of claim 10 wherein the antioxidant is present during coagulation of liquid latex to produce the styrene butadiene elastomer.

12. The stabilized styrene butadiene elastomer composition of claim 11 wherein the antioxidant is blended with the liquid latex before or during coagulation of the latex to produce the elastomer.

13. The stabilized styrene butadiene elastomer composition of claim 9 wherein the antioxidant is blended with the styrene butadiene elastomer.

14. A method of making a stabilized elastomer composition, comprising the steps of:
providing an elastomer which is substantially free of synthetic antioxidants;
providing a natural antioxidant which includes about 7–20% by weight alpha tocopherol, 45–75% by weight gamma tocopherol, 18–32% by weight delta tocopherol and 0–3% by weight beta tocopherol; and
incorporating the natural antioxidant into the elastomer.

15. The method of claim 14, wherein the natural antioxidant is incorporated into the elastomer during manufacture of the elastomer.

16. The method of claim 15, wherein the manufacture of elastomer includes the step of coagulating a liquid latex material.

17. The method of claim 16, wherein the natural antioxidant is blended with the liquid latex material before or during coagulation.

18. The method of claim 14, wherein the natural antioxidant is blended with the elastomer.

19. The method of claim 14, wherein the natural antioxidant is incorporated in an amount of about 0.01–1.00 weight percent of the composition.

20. The method of claim 14, where the natural antioxidant is incorporated in an amount of about 0.05–0.80 weight percent of the composition.

21. The method of claim 14, wherein the natural antioxidant is incorporated in an amount of about 0.10–0.60 weight percent of the composition.

22. The method of claim 14, wherein the antioxidant comprises about 12–17% by weight alpha tocopherol, 60–68% by weight gamma tocopherol, 22–28% by weight delta tocopherol and 0–3% by weight beta tocopherol.

23. The method of claim 14, wherein the antioxidant comprises about 12–15% by weight alpha tocopherol, 63–65% by weight gamma tocopherol, 23–26% by weight delta tocopherol and 0–3% by weight beta tocopherol.

24. The method of claim 14, wherein the elastomer comprises styrene butadiene rubber.

25. The method of claim 14, wherein the elastomer is styrene butadiene rubber.

* * * * *